Patented Oct. 25, 1938

2,134,136

UNITED STATES PATENT OFFICE 2,134,136

SPRAY OIL PENETRATION CONTROL

Frank F. Lindstaedt, Oakland, Calif.

No Drawing. Application May 31, 1935,
Serial No. 24,359

8 Claims. (Cl. 167—28)

The invention relates to agricultural and horticultural spray compositions.

Parasiticidal horticultural spray compositions of the type to which the present invention is related are commonly of the water and oil emulsion type although in certain instances of dormant spraying and in compositions used for spraying from an airplane the water is frequently omitted. However, in either instance since it is the oil component of the spray composition which operates to suffocate or otherwise exterminate the parasite, the quantity of oil deposited on the plant surface has been in the past, the principal and substantially ultimate feature of emphasis. Thus, generally speaking and when viewed from the factor of oil deposited alone, the heavier the deposit of hydrocarbon or other spray oil, the higher is the percentage of parasital kill obtained. There is, however, a limit to the deposit of oil, both from an economical standpoint of the spraying cost alone, and also the deleterious effect of the heavy spray deposits on the plant itself. In the latter consideration it has been found that certain parasitic cases, such as some obstinate infestations of red scale or the like, it has been necessary in order to obtain a complete kill of the parasite to deposit an amount of oil which may very seriously impair the growth of the plant. Now, through carefully executed experimentation and using other than plant surfaces for supporting various parasites, I have found that for practically all parasites but a relatively light film of oil is all that is required to produce a kill, and that the significant factor involved is not the quantity of oil deposit, but rather the persistence, durability and life of the oil film placed in covering relation over the parasite. The discrepancy between this finding and the usual horiticultural spray practice of using very considerably higher oil deposits, I have further found to be chiefly due to the rapid absorption and penetration of the oil deposited into the pores and vascular system of the plant surfaces. Thus, in ordinary spray practice, it has been heretofore necessary to deposit a quantity of oil which would permit of the aforesaid penetration into the plant structure and yet maintain a sufficient quantity of oil on the plant surface to attack the parasites. In accordance with the present invention, and as a principal object thereof, I include, in a horticultural spray of the character described, means which serve to hold the oil deposits on the surface of the plant being sprayed and against wasteful and deleterious penetration into the plant structure. Thus, I have provided a spray composition which will afford a full and satisfactory parasiticidal control when used in but small dosages and with relatively low oil deposits, and in this manner not only effect a very substantial saving in spraying costs, but also relieve the plant from the task of freeing its vascular system of the normally highly absorbed hydrocarbon oil.

Another object of the invention is to provide a spray composition of the character described which will provide greatly improved parasiticidal characteristics with the lower viscosity hydrocarbon oils.

A further object of the invention is to provide in a spray composition a means of the character described which will in itself have a parasiticidal control value.

The invention possesses other objects and features of advantage, some of which, with the foregoing, will be set forth in the following description of the preferred form of the invention. It is to be understood, however, that variations in the mode of effecting the invention as explained in the description may be adapted within the scope of the invention as set forth in the claims.

Briefly stated the present invention provides for the inclusion in a horticultural spray composition using a petroleum or hydrocarbon oil, an oil which on being sprayed with the spray composition will form on the plant surface molecular aggregates which function to hold the hydrocarbon oil on the surface and against penetration into the plant structure. The new oil included in the present invention for carrying out this penetration control is preferably selected from either an animal or vegetable source. I am aware that attempts have been made heretofore to include various of these oils in a horticultural spray, but these attempts have been made to produce other spray characteristics such as an increased oil deposit, or have, when used to check the penetration of the hydrocarbon oil, produced but slight, if not negligible, results. It will be understood, therefore, that I do not attempt the use of such oils as have heretofore been used, but rather the invention involves the use of certain of these oils in their raw and treated state, as will be more fully hereinafter set forth.

As is well known, the animal and vegetable oils are ordinarily comprised of a rather complex hydrocarbon chain including single and double and multiple bonds of carbon atoms, and when sprayed or otherwise arranged in a film in direct exposure with the air, there occurs a breaking down of the multiple bonds and a taking up of oxygen from the air which increases both the specific gravity and the viscosity of these oils. In the case of many animal and vegetable oils this process will continue until the oil reaches a tacky state, although in a few instances the process will carry through to the production of a solid film. By using sufficient of this oil together with a spray composition, it is readily conceivable and understood that the oil on reaching a tacky state would serve to hold the spray composition on a plant surface or the like, and by chemical and physical affinity hold the spray composition against penetration into the plant structure. However, in the case of many of these oils, such as those used heretofore, the drying or oxidizing process is so slow that when used with a hydrocarbon oil, which will very rapidly penetrate into the vascular system of the plant, a very considerable amount if not substantially all of the hydrocarbon oil would be absorbed by the plant before the added oil would have oxidized sufficiently to have any appreciable holding effect. In accordance with the present invention I use those animal and vegetable oils as are classed in the art as drying oils or semi-drying oils and which in certain instances are treated before being added to effect a reduction of the multiple bonds, or to include therewith certain catalysts which will accelerate such reduction on exposure to the air. Thus, in either case the time consumed by these oils, after being sprayed, to reach a state wherein they will have an appreciable effect on holding a hydrocarbon oil against penetration into the plant system is very materially hastened. In certain instances this effect is immediately present, and in substantially all instances its holding effect takes place within such a short time after the material is sprayed as to make the use of these oils most important for controlling the penetration of the hydrocarbon oil.

The treatment of these oils referred to in the foregoing includes principally the production of three clases of oils, to wit; boiled, blown and polymerized oils. As a common instance of the first case, as is well known, the oil is warmed and has added thereto certain metallic catalysts such as cobalt, lead, manganese, iron, zinc and others which serve when the oil is spread into a thin film in exposure to the atmosphere to accelerate the breaking down of the multiple bonds of the oil molecules and the taking up thereby of oxygen, or in other words accelerate the oxidation or drying of the oil. In the case of blown oil, as is understood, the oil is commonly prepared by passing streams of oxygen or air through the oil when the same is heated so as to, in this manner, partially complete the oxidizing process. Thus, not only is the specific gravity and viscosity of the oil increased, but by reason of the fact that a reduced number of multiple bonds remain in the oil molecules, a lesser time is required to carry the oxidizing process to completion once the oil is exposed to the atmosphere. The polymerized oils, on the other hand and as is well known, may be formed by heating the oil with or without the inclusion of condensing agents to a point where the molecular instability caused by the multiple bonds grows acute and a breaking up of certain of these bonds by intermolecular and intramolecular reactions takes place. Thus, an oil hydrocarbon chain results, as in the case of the blown oils, with a considerably reduced number of multiple bonds which, as above explained, will therefore carry through to a complete state of oxidation when exposed to the atmosphere within a much shorter time than would be required by the raw and untreated oil.

These oils, that is the boiled, blown and polymerized oils, and certain other oils in their raw state, are known in the art, as a class, as drying or semi-drying oils, the latter pertaining more particularly to those animal and vegetable oils which on oxidation reach only a tacky state, and will not ordinarily follow through to a solid film. I have found that when these oils are added to the hydrocarbon spray oil in the proportion up to about 5 per cent and sprayed, that even relatively light deposits of spray oil will persist in film form on a plant surface for days and even weeks after a similar or heavier deposit of hydrocarbon oil by itself would be absorbed completely into the plant structure. As previously pointed out, only a light deposit of hydrocarbon oil is required to kill most parasites, provided that the oil is maintained in covering relation over the parasite for a time sufficient to produce suffocation. By the inclusion of a drying oil of the character described with the hydrocarbon oil, and by reason of the retaining effect of the first mentioned oils of the hydrocarbon oil on the surface of the plant, the spray composition of the present invention provides a very greatly improved control of the parasite while at the same time relieving the plant from the deleterious penetration of the hydrocarbon oil into its vascular system.

In order to afford a direct measure of the penetration control effect of these materials, I have devised a laboratory apparatus from which accurate comparative determinations may be made of the penetration control of various oils and other substances. This apparatus consists essentially in a member which is arranged to be saturated with the material to be tested and which is placed in contact with a vertical absorbent member to which the test material is drawn and which provides a ready and convenient vertical scale for testing the rate and quantity of absorption of the material from the first member. In order to standardize the tests, the first member may be comprised of a one inch diameter disc cut from coarse blotting paper and which is first immersed in the material to be tested until thoroughly saturated and then removed and placed on a horizontally mounted plate glass. The second member mentioned above is preferably composed of a strip, 0.875 inches wide by 2 inches long, cut from number 36 "Dreadnaught" ledger paper and which is treated by immersing in benzol containing 1 per cent pure gum rubber and allowed to soak for one hour. The strips when removed from the solution are blotted quickly between filter paper so as to remove excess solution and allowed to dry for twelve hours before use. This treatment fills to some extent the pores in the paper and greatly increases the uniformity of the surface structure of the strips for insuring an accurate comparison of the materials tested. Each of the measurements herein given were further standardized by extending the penetration determination over a period of 7½ hours at a constant temperature of 65° F. As an index of comparison I have selected a commonly used grade of 60 viscosity western hydrocarbon oil and have found that this oil will rise in the vertical strips under the conditions set forth to a height of 1.237 inches. With the inclusion of the materials of the present invention with this hydrocarbon oil, and by reason of the holding effect of such materials for preventing a penetration of the oil, as above explained, the rise of the hydrocarbon oil in the vertical strips is somewhat reduced, and when measured affords a direct and determinable comparison. For instance, with the 60 viscosity hydrocarbon oil aforesaid, the oil rise in the vertical strips is but 1.051 inches. Thus, the latter spray mixture penetrates a distance 0.186 inches less than the plain 60 viscosity hydrocarbon oil which affords a direct measure of its penetration control value. For convenience I express this difference in hundredths of an inch so as to obtain comparisons based on numbers greater than unity. This gives a penetration control value of the composition using the 3 per cent blown herring oil as above, of 18.6. Tabulated below is the measured penetration control values of a list of spray compositions including both materials which have been heretofore used and also certain materials as embodied in the present invention:

| Composition | Value |
|---|---|
| 60 viscosity western oil (unit of comparison) | 0 |
| 60 viscosity western oil plus 1% glyceryl oleate | 1.2 |
| 60 viscosity western oil plus 1% glyceryl oleate plus ½% aluminum naphthenate | 2.4 |
| 60 viscosity western oil plus 1% glyceryl oleate plus 1½% aluminum naphthenate | 5.3 |
| 60 viscosity western oil plus 1% glyceryl oleate plus 3% aluminum naphthenate | 8.5 |
| 60 viscosity western oil plus 3% aluminum naphthenate | 7.3 |
| 60 viscosity western oil plus ⅓% sulphonated naphthenic acid plus ⅔% naphthenic acid | 2.8 |
| 60 viscosity western oil plus ⅓% sulphonated naphthenic acid plus 3⅔% naphthenic acid | 11.0 |
| 60 viscosity western oil plus 3% blown sardine oil | 18.6 |
| 60 viscosity western oil plus 6% blown sardine oil | 29.7 |
| 60 viscosity western oil plus 8% blown menhaden oil | 39.6 |
| 60 viscosity western oil plus 6% blown menhaden oil plus 3% normal butyl acetate | 39.5 |
| 60 viscosity western oil plus 3% blown soya bean oil | 9.3 |
| 60 viscosity western oil plus 3% raw herring oil | 3.6 |
| 60 viscosity western oil plus 3% blown herring oil | 19.2 |
| 60 viscosity western oil plus 3% blown boiled menhaden oil | 10.3 |
| 60 viscosity western oil plus 3% raw tung oil | 15.9 |
| 60 viscosity western oil plus 3% boiled tung oil | 58.9 |
| 68 viscosity western oil | 20.1 |
| 78 viscosity western oil | 35.4 |

The following example will show the practical significance of this table. A water and oil emulsion including 1¾ per cent of 60 viscosity western oil and sprayed on orange tree foliage provided an oil deposit of 90 milligram per 100 square inches which in approximately three days completely disappeared from the surface of the foliage and had penetrated into the leaves. By way of comparison I added to a spray composition substantially equivalent to the above, that is using 1¾ per cent 60 viscosity western oil, 6 per cent blown menhaden oil and sprayed this composition on orange tree foliage, as before. In this particular case oil deposit determination showed a somewhat less deposit of but 49 milligrams per 100 square inches. However, as will be noted from the table, the penetration control value of this latter composition, as compared to the first, is 39.5, and as predicted by this value, oil was still visible on the surface of the foliage thirty-five days after being sprayed, and this notwithstanding the fact that about 1.83 times as much oil was deposited on the surface with the first mentioned composition as with the one using the 6 per cent blown menhaden oil of the present invention.

Penetration control values of spray materials as determined by the method hereinbefore pointed out has brought forth a new concept in regard to spray oils. This concept is to rate spray oils by their penetration control value rather than on their viscosity, as has been the practice heretofore, since it follows from the foregoing that the degree of penetration of the spray composition into the vascular system of the plant is not alone a direct function of the viscosity of the composition, although this latter characteristic may be a factor. For instance, out of five different samples of 78 viscosity western hydrocarbon oil, there was a variance in penetration control value of over 8.7. Also, as will be clear from the table, the addition of but 6 per cent blown menhaden oil to 60 viscosity hydrocarbon oil increases the penetration control value of this oil above that of even 78 viscosity hydrocarbon oil, and, as will be understood, the relatively small amount of the blown oil which is added to the hydrocarbon oil will not appreciably, or in any event proportionately increase its viscosity. Thus, based on penetration control value, the 60 viscosity oil plus the blown menhaden oil will at least be as effective as a 78 viscosity oil will and at the same time not subject the plant to the well known harmful effect entailed in the use of a high viscosity hydrocarbon oil.

As will be further understood, most of these boiled, blown and polymerized animal and vegetable oils will, when added in small proportions go into solution in the hydrocarbon oil, and in doing so, and by reason of their own hydrocarbon structure have the tendency of increasing the parasiticidal value of the hydrocarbon oil. By reason of this and the other features provided by a solution of the drying oils and the hydrocarbon oils, it will be understood that these drying oils are not to be confused with other materials which have been previously used to afford an increased oil deposit and other characteristics, but which have been only wetted by or colloidally dispersed in the hydrocarbon oil.

While I have here tabulated the penetration control value of certain drying and semi-drying oils, it will be clear that these have been given for the purpose of illustration and that I do not confine myself specifically thereto. Other oils which I may use include the boiled, blown or polymerized form of various fish and vegetable oils including those oils which have been hereinbefore enumerated, and also I may use other oils which by reason of their oxidizing characteristics are classed in the art as drying or semi-drying oils.

I claim:

1. A parasiticidal spray composition comprising, a hydrocarbon oil, and a drying oil dissolved in said hydrocarbon oil in sufficient amount on being sprayed to form on the surface of the subject sprayed molecular aggregates for holding said hydrocarbon oil on said surface and against penetration in the subject.

2. In a parasiticidal spray composition the combination of a hydrocarbon oil, and a drying oil of the class consisting of boiled oils, blown oils and polymerized oils and being effective when applied to a porous subject to retard penetration of said hydrocarbon oil into said subject.

3. A parasiticidal spray composition including, a hydrocarbon oil, and a drying fish oil.

4. A parasiticidal spray composition including, a hydrocarbon oil, and a blown fish oil.

5. In a horticultural parasiticidal spray composition the combination of a petroleum oil, and a drying fish oil of the class consisting of boiled fish oils, blown fish oils and polymerized fish oils and being effective when applied in said combination to a porous subject to retard penetration of said petroleum oil into said subject.

6. In a horticultural parasiticidal spray composition the combination of a petroleum oil, and a blown sardine oil effective when applied in said combination to a porous subject to retard penetration of said petroleum oil into said subject.

7. In a horticultural parasiticidal spray composition the combination of a petroleum oil, and a boiled tung oil effective when applied in said combination to a porous subject to retard penetration of said petroleum oil into said subject.

8. An insecticidal spray oil composition comprising a mineral oil and a small quantity of an oil selected from the group consisting of blown fatty oils, boiled fatty oils and polymerized fatty oils.

FRANK F. LINDSTAEDT.